United States Patent [19]

Ponticello

[11] 4,011,201

[45] Mar. 8, 1977

[54] POLYMERS OF MONOMERS CONTAINING ACTIVE METHYLENE GROUPS AND OTHER ETHYLENICALLY UNSATURATED MONOMERS

[75] Inventor: Ignazio S. Ponticello, Rochester, N.Y.

[73] Assignee: Eastman Kodak Company, Rochester, N.Y.

[22] Filed: Nov. 13, 1975

[21] Appl. No.: 631,801

Related U.S. Application Data

[62] Division of Ser. No. 497,803, Aug. 15, 1974, Pat. No. 3,939,130.

[52] U.S. Cl. .................. 260/65; 96/87 R; 260/63 R; 260/63 UY; 260/66; 260/79.3 MU; 260/79.7; 260/483; 260/561 K
[51] Int. Cl.² .................. C08F 28/00; C08G 75/00
[58] Field of Search .......... 260/65, 63 R, 63 UY, 260/66, 79.3 MU, 79.7, 483, 561 K

[56] References Cited

UNITED STATES PATENTS

| | | | |
|---|---|---|---|
| 2,070,603 | 2/1937 | Kilgore | 260/483 |
| 2,228,170 | 1/1941 | Kilgore | 260/483 |
| 2,323,391 | 7/1943 | Goodman | 260/561 K |
| 2,432,499 | 12/1947 | Boese | 260/561 K |
| 2,806,047 | 9/1957 | Bullock | 260/483 |
| 3,142,692 | 7/1964 | Maggiulli et al. | 260/483 |
| 3,939,130 | 2/1976 | Ponticello | 260/65 |

Primary Examiner—Ronald W. Griffin
Attorney, Agent, or Firm—Arthur H. Rosenstein

[57] ABSTRACT

Disclosed herein is a polymer comprising

A. from about 1 to 100% by weight of a polymerized monomer containing at least one active methylene group and having the formula

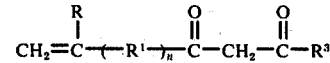

wherein $n$ is 0 or 1, R is hydrogen or methyl, R' is substituted or unsubstituted arylenethylene having the structure

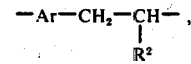

wherein Ar is arylene, $R^2$ is hydrogen, alkyl, aryl, or cycloalkyl, $R^3$ is alkoxy or amino when n is equal to 0, and $R^3$ is alkyl, alkoxy, amino, cycloalkyl or aryl when n is equal to 1; and B. from 0 to about 99% by weight of at least one additional polymerized ethylenically unsaturated monomer.

11 Claims, No Drawings

POLYMERS OF MONOMERS CONTAINING ACTIVE METHYLENE GROUPS AND OTHER ETHYLENICALLY UNSATURATED MONOMERS

This is a division of application Ser. No. 497,803, filed Aug, 15, 1974, now U.S. Pat. No. 3,939,130, issued Feb. 17, 1976.

This invention relates to organic materials which are particularly useful in the photographic field. In particular, this invention relates to the composition of such organic materials, particularly polymeric materials which can be incorporated into photographic elements and emulsions to obtain a desirable combination of properties.

Photographic elements employed in phtography, must have good physical and photographic properties. Owing to its unique properties, including its good dispersing property and its excellent protective colloid properties, gelatin has been used as the binding agent in layers of photographic elements for many years. Gelatin is, however, subject to dimensional change when subjected to varying temperature, humidity and like conditions. Many natural and synthetic materials have been proposed as substitutes or partial substitutes for gelatin in one or more layers of photographic elements to improve dimensional stability. For example, as shown in U.S. Pat. No. 3,062,674 issued Nov. 6, 1962 and U.S. Pat. No. 3,142,568 issued July 28, 1964, vinyl or addition polymers are employed in binding agents in layers of photographic elements to improve physical properties, including dimensional stability. However, the use of such polymers in layers of photographic elements, often adversely affects the hardness of the layers, their resistance to abrasion, and their adhesion to film supports.

Japanese Pat. No. 7,002,726 describes a copolymer of the general formula

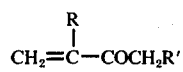

where R and R' are hydrogen or a lower alkyl, halide, OH, or acetyl or acetoxyl group and at least one vinyl monomer selected from styrene, acrylonitrile, vinyl acetate, vinyl chloride, ethyl methacrylate and acrylamide. The polymers described in this Japanese patent do not contain active methylene groups except when $R^1$ is acetyl. In that case, the copolymer which is outside the scope of the present invention is inoperative for the purposes of this invention.

Polymers containing active methylene groups which serve as crosslinking sites that are reactive with conventional gelatin hardeners are disclosed in U.S. Pat. Nos. 3,459,790; 3,488,708, 3,554,987 and 3,658,878. In these polymers, the active methylene group is located in a side chain and is linked to the main chain of the polymer through an ester group. Use of these polymers has, in large measure, resolved the problem of adverse effects upon layer hardness, resistance to abrasion and adhesion to film supports referred to above. Under certain conditions, however, this ester group may tend to hydrolyze with consequent loss of the crosslinking site. It is evident, therefore, that a substitute for gelatin which is not subject to such defects will greatly enhance the art.

Accordingly, it is an object of this invention to provide monomers containing active methylene crosslinking sites and crosslinkable polymers containing active methylene crosslinking sites in at least some of the side chains therein, wherein the group joining the side chain to the polymer backbone possesses increased resistance to hydrolysis.

It is another object of this invention to provide polymers having the desirable properties described above that can be hardened, with conventional gelatin hardening agents, for example, aldehydes and bis(vinylsulfonyl) compounds and which can be used as binding agents in photographic elements containing silver halide having desirable color, hardening and sensitometric properties.

Other objects of this invention will become apparent from an examination of the specification and Claims which follows.

In accordance with this invention, it has been found that an ethylenically-unsaturated monomer containing an active methylene function can be homopolymerized or polymerized with at least one additional monomer to yield polymers which are useful, for example, as gelatin extenders and modifiers which will crosslink with the common gelatin hardening agents. More particularly, the present invention comprises a polymer comprising A. from about 1 to 100 % by weight of a polymerized monomer containing at least one active methylene group and having the formula

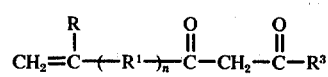

wherein $n$ is 0 or 1, R is hydrogen or methyl, R' is substituted or unsubstituted arylenethylene having the structure

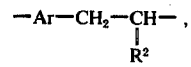

wherein Ar is arylene, $R^2$ is hydrogen, alkyl, aryl, or cycloalkyl, $R^3$ is alkoxy or amino when n is equal to 0, and $R^3$ is alkyl, alkoxy, amino, cycloalkyl, or aryl when n is equal to 1; and B. from 0 to about 99 % by weight of at least one additional polymerized ethylenically unsaturated monomer.

The monomers according to this invention containing the active methylene groups can be reacted with themselves to form homopolymers, or can be reacted with at least one other ethylenically unsaturated monomer to form a polymeric substance. The polymers produced by the practice of this invention are addition homopolymers or interpolymers containing active methylene groups in the side chains of the homopolymers or interpolymers. Active methylene groups, as described herein, are methylene groups between two electronegative carbonyl groups. Such methylene groups exhibit unusual chemical activity and are said to be "active".

The molecular weights of the polymers of this invention are subject to wide variation, but are often in the range of about 5000 to about 500,000. These polymers, which are generally water soluble, preferably have inherent viscosities (0.25 g. polymer in 100 ml. 1 N.

sodium chloride at 25° C.) from 0.10 to 2.0, more preferably from about 0.25 to about 1.25.

As set out above, polymers included in this invention are homopolymers or interpolymers of a first polymerized monomer with up to 99% by weight of a second polymerized monomer, said first polymerized monomer having the formula

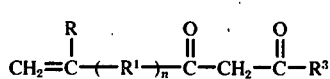

wherein $n$ is 0 or 1 and R is hydrogen or methyl.

R' is substituted or unsubstituted arylenethylene, having the structure

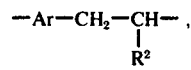

wherein Ar is arylene, preferably of from 6 to 12 carbon atoms, e.g. phenyl, naphthyl, which can be substituted, if desired, with alkyl or alkoxy groups, preferably of from 1 to 10 carbon atoms, as exemplified by methyl, ethyl, propyl, butyl, pentyl, hexyl, heptyl, octyl, nonyl, decyl, and isomers thereof, methoxy, ethoxy, propoxy, butoxy, pentyloxy, etc. More preferably, where Ar is substituted, it is substituted with lower alkyl or alkoxy groups of from 1 to 5 carbon atoms. Ar also can have substituents which are cycloalkyl, preferably of from 5 to 7 carbon atoms, such as, for example, cyclopentyl, cyclohexyl, or cycloheptyl, cyano, halide, such as bromide, chloride, fluoride, and iodide, and others known to those skilled in the art. $R^2$ is hydrogen, alkyl, aryl, or cycloalkyl, as described above.

When $n$ is equal to 0, $R^3$ can be alkoxy, preferably of from 1 to 10 carbon atoms; more preferably of from 1 to 5 carbon atoms, as described above. When $n$ is equal to 0, $R^3$ also can be amino, having the structure

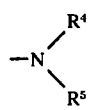

wherein $R^4$ and $R^5$ are hydrogen, substituted or unsubstituted alkyl, preferably having from 1 to 10 carbon atoms, substituted or unsubstituted cycloalkyl, preferably of from 5 to 7 carbon atoms, such as, for example, cyclopentyl, cyclohexyl, or cycloheptyl, or substituted or unsubstituted aryl, preferably of from 6 to 12 carbon atoms as described above, e.g. phenyl and naphthyl.

When $n$ is equal to 1, $R^3$ can be alkyl or alkoxy, each preferably having from 1 to 10 carbon atoms, as exemplified by methyl, ethyl, propyl, butyl, pentyl, hexyl, heptyl, octyl, nonyl, decyl, and isomers thereof, methoxy, ethoxy, propoxy, butoxy, pentyloxy, etc.; it is more preferred that where $R^3$ is alkyl or alkoxy, it contains from 1 to 5 carbon atoms. When n is equal to 1, $R^3$ also can be amino having the structure

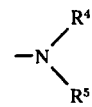

wherein $R^4$ and $R^5$ are as defined above; or substituted or unsubstituted cycloalkyl, preferably of from 5 to 7 carbon atoms, such as, for example, cyclopentyl, cyclohexyl, or cycloheptyl; or aryl, preferably of from 6 to 12 carbon atoms, e.g., phenyl, naphthyl, unsubstituted or substituted with alkyl, carboxyl, alkoxycarbonyl and the like, e.g. tolyl, xylyl, benzyl, etc.

Two particularly useful monomers containing active methylene groups according to this invention are ethyl acryloylacetate and 6-(m- and p-vinylphenyl)-2,4-hexanedione. The latter is a mixture of the meta (60 percent, by weight) and para (40 percent) isomers of the substituted aryl which are not easily separated. Little difference in behavior in polymerization between the mixture and the pure isomers is observed.

These two monomers can be polymerized to advantage with one or more monomers as shown in the following preferred embodiments of this invention: a copolymer of ethyl acryloylacetate (20–5 weight percent) and acrylamide (80–95 weight percent); a copolymer of ethyl acryloylacetate (50 weight percent) and methacrylic acid (50 weight percent); a terpolymer of ethyl acryloylacetate (5–20 weight percent), and N-(lower alkyl) acrylamide, e.g., N-isopropylacrylamide (5–20 weight percent), and a salt of a sulfoacrylate, e.g., sodium 3-methacryloyloxypropane-1-sulfonate, (50-90 weight percent); a copolymer of 6-(m- and p-vinylphenyl)-2,4-hexanedione (20-80 weight percent) and sodium 3-methacryloyloxypropane-1-sulfonate (80–20 weight percent); a copolymer of 6-(m- and p-vinylphenyl)-2,4-hexanedione (20–80 weight percent) and sodium p-styrene sulfonate (80–20 weight percent); and a copolymer of 6-(m- and p-vinylphenyl-2,4-hexanedione (20–80 weight percent) and sodium 2-acrylamido-2-methylpropane-1-sulfonate (80–20 weight percent).

The preparation of ethyl acryloylacetate follows procedures as described by N. Nazarov and S. I. Zavyalov, Zh. Obshch. Khim., 23, 1973 (1953); and E. Wenkert, A. Afonso, J. B-Son Bredenberg, C. Kaneko and A. Tahara, J. Am. Chem. Soc., 86, 2038 (1964); G. Stork and R. Natix Guthikonda, Tetrahedron Letters, 27, 2755–58, (1972).

The synthesis of ethyl acryloylacetate as described in the references above follows the reaction sequence shown below.

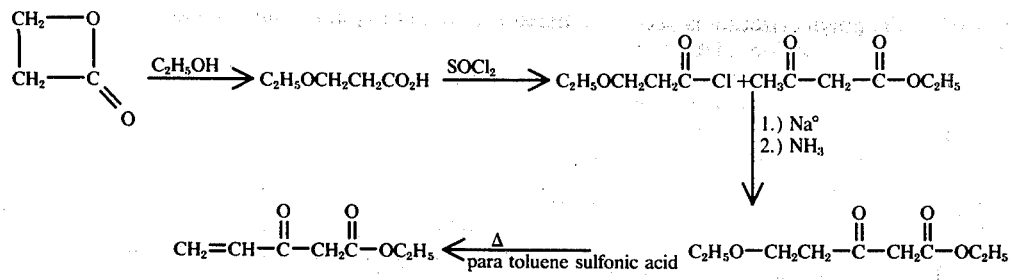

The preparation of endo and exo-5-carbo-tert-butoxyacetyl-2-norborine can be carried out by adding to n-butyl lithium (2 moles) in tetrahydrofuran (2 liters) at 0° C. 2 moles of N-isopropylcyclohexylamine. To this solution at -78° C. is added dropwise tertiary butyl acetate over a period of one hour, followed after 30 minutes by the addition of an acid chloride having the formula

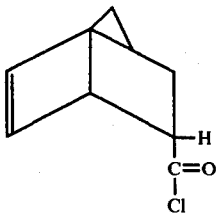

The cooling bath is removed and the mixture is stirred at room temperature for one hour and quenched with concentrated hydrochloric acid (300 ml.) in water (700 ml). The mixture is allowed to reach room temperature and the organic layer is separated. The aqueous layer is extracted with either and the combined extracts are washed with saturated $NaHCO_3$ (500 ml), dried over anhydrous $MgSO_4$, filtered and the solvent removed. The beta keto ester residue has the formula:

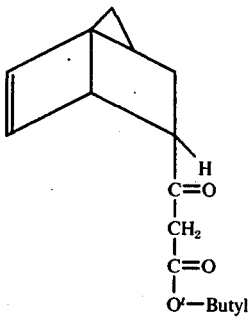

Tertiary butyl acryloylacetate can be prepared by adding 0.49 mole of the above prepared beta ketoester to the top of a vertical quartz tube packed with quartz chips kept at 500° C. The crude product is collected under reduced pressure and cooled at −20° C. The material is then distilled.

N,N-dimethylacryloylacetamide is prepared by the method described above for the beta ketoester, except that the material is not distilled before pyrolyzing in the quartz tube.

The preparation of 6-(m- and p-vinylphenyl)-2,4-hexanedione follows procedures as described by C. R. Hauser and T. M. Harris, *J. Amer. Chem. Soc.*, 80, 6360 (1958); and L. Weller, *J. Amer. Chem. Soc.*, 92, 6702 (1970) and is described in Example 14 herein.

As noted above, polymers of this invention may comprise up to 99% by weight of at least one additional polymerized ethylenically unsaturated monomer. As exemplary of such monomers may be listed: vinyl esters, amides, nitriles, ketones, halides, ethers, alpha-beta unsaturated acids or esters thereof, olefins, diolefins and the like, as exemplified by acrylonitrile, methacrylonitrile, styrene, alpha-methyl styrene, sodium p-styrenesulfonate, acrylamide, methacrylamide, vinyl chloride, methyl vinyl ketone, fumaric, maleic and itaconic esters, 2-chloroethyl vinyl ether, acrylic acid, sodium methacryloyloxyethyl sulfate, sodium 2-acrylamido-2-methylpropane-1-sulfonate, methacrylic acid, dimethylaminoethyl methacrylate, 4,4,9-trimethyl-8-oxo-7-oxa-4-azonia-9-decene-1-sulfonate, N-vinylsuccinamide, N,N-dimethyl-N-2-hydroxypropylamine methacrylimide, N-vinylphthalimide, N-vinylpyrrolidone, butadiene, isoprene, vinylidene chloride, ethylene and the like. Sulfoacrylate salts are particularly useful as comonomers in the practice of this invention. Examples of such salts are sodium 3-methacryloyloxypropane-1-sulfonate, sodium 3-acryloyloxypropane-1-sulfonate, sodium 4-acryloyloxybutane-2-sulfonate, 3-methyl-1-vinylimidazolium methosulfate, 1,2-dimethyl-5-vinylpyridinium methosulfate and others as described in Dykstra, U.S. Pat. No. 3,411,911 issued Nov. 19, 1968.

When the polymer contains up to 30% by weight of one or more of the monomers containing active methylene groups, the polymerization can usually be carried out as a solution polymerization in a suitable medium, for example, water or mixtures of water with water miscible solvents, as exemplified by methanol, ethanol, propanol, isopropanol, and the like. When the polymer contains more than 30% by weight of one or more monomers containing active methylene groups, the polymerization can usually be carried out by solution polymerization in a suitable organic solvent, for example, acetone, benzene, cyclohexanone, N,N-dimethylformamide, dimethyl sulfoxide, tetrahydrofuran, and the like; or by aqueous emulsion or suspension polymerization according to methods well know to those skilled in the art.

The temperature at which the polymers described herein are prepared is subject to wide variation since this temperature depends upon such variable features as the specific monomer used, duration of heating, pressure employed and like considerations. However, the polymerization temperature generally does not exceed about 110° C., and most often it is in the range of about 50° to about 100° C.

The pressure employed in the polymerization is usually only sufficient to maintain the reaction mixture in liquid form, although either superatmospheric or subatmospheric pressures can be used where such use is advantageous. The concentration of polymerizable monomer in the polymerization mixture can be varied widely with concentrations up to about 100%, by weight, and preferably about 20 to about 70%, by weight, based on the weight of the polymerization mixture, being satisfactory. Suitable catalysts for the polymerization include, for example, the free radical catalysts, such as hydrogen peroxide, cumene hydroperoxide, water soluble azo type initiators and the like. In redox polymerization systems conventional ingredients can be employed. If desired, the polymer can be isolated from the reaction vehicle by freezing, salting out, precipitation or any other procedure suitable for this purpose.

As indicated in U.S. Pat. No. 3,142,568, issued July 28, 1964, it is sometimes advantageous to include a surface active agent or compatible mixtures of such agents in the preparation of vinyl or addition polymers. Suitable wetting agents include the non-ionic, ionic and amphoteric types as exemplified by the polyoxyalkylene derivatives, amphoteric amino acid dispersing agents, including sulfobetaines and the like. Such wetting agents are disclosed in U.S. Pat. No. 2,600,831, issued June 17, 1952; U.S. Pat. No. 2,271,623 issued Feb. 3, 1942; U.S. Pat. No. 2,275,727 issued Mar. 10, 1942 and U.S. Pat. No. 2,787,604 issued Apr. 2, 1957; U.S. Pat. No. 2,816,920 issued Dec. 17, 1957; and U.S. Pat. No. 2,739,891 issued Mar. 27, 1956.

Photographic silver halide dispersions containing addition homopolymers or interpolymers containing active methylene groups, in combination with photographic binding agents, such as gelatin, can be made in a variety of ways. For example, an aqueous gelatine dispersion of the photographic silver halide can be mixed with an aqueous dispersion or solution of the homopolymer or interpolymer. Alternatively, the photographic silver halide can be precipitated in an aqueous dispersion or solution of the homopolymer or interpolymer with or without another colloid, depending upon the dispersing characteristics of the homopolymer or interpolymer. In this case, a water-soluble salt such as silver nitrate is admixed with a water-soluble halide such as potassium bromide in the presence of the mixture. In still another procedure, the photographic silver halide is precipitated in an aqueous solution and digested in the conventional manner known to the art. After digestion, but prior to coatings, there is added to the emulsion an aqueous dispersion of the homopolymer or interpolymer containing active methylene groups in its side chains. The bulk of the resulting dispersion can be increased by the addition of more of the homopolymer or interpolymer and/or natural or synthetic colloids or other binding agents suitable for use in photographic silver halide emulsions. Satisfactory colloids include, for example, gelatin, protein derivatives e.g. carboxy methylated proteins, colloidal albumin, cellulose derivatives, synthetic resins such as polyvinyl compounds e.g. polyacrylamide and the like.

The gelatin substitutes described herein can be employed as the binding agent in one or more layers of a photographic silver halide element. However, photographic silver halides are generally precipitated in the presence of binding agents such as gelatin or other colloids which exhibit very good peptizing action. Therefore, the photographic silver halide emulsions or layers containing polymers of this invention will often contain some binding agent such as gelatin which exhibits this very good peptizing action. Where such is the case, the concentration of the homopolymers or interpolymers described herein as gelatin substitutes will be in the range of from 20 to about 85%, often in the range of about 50 to about 85%, by weight, based on total binding agent (dry weight), employed in photographic emulsions, photographic emulsion layers or other layers of a photographic element. The remainder of the binding agent is gelatin usually, although other colloids also give good results. Where the polymers are used in photographic elements in layers other than the emulsion layers, for example, in filter layers, antihalation layers, antibrasion layers, antistatic layers, barrier layers, receiving layers for diffusion transfer processes and the like, they can be used as the sole vehicle or in admixture with natural or synthetic colloids such as are mentioned hereinbefore. The silver halide employed in the preparation of light sensitive coatings described herein includes any of the photographic silver halides as exemplified by silver bromide, silver chloride and silver iodide, or mixed silver halides such as silver chlorobromide, silver bromoiodide, and the like. Very good results are obtained with high contrast silver halide emulsions in which the halide comprises at least 50 mole percent chloride. Preferred emulsions of this type contain at least 60 mole percent chloride; less than 40 mole percent bromide and less than 5 mole percent iodide.

The polymers described herein can be incorporated into gelatin emulsions to provide an emulsion with increased hardness properties. The final resultant hardness of said emulsion is apparently dependent on the ratio of the gelatin in the emulsion and the absolute concentration of the active methylene units in the homopolymer or interpolymer.

Emulsions containing the homopolymers or interpolymers of this invention can be chemically sensitized with compounds of the sulfur group as described in Sheppard et al. U.S. Pat. No. 1,623,499 issued Apr. 5, 1927, noble metal salts such as gold salts, reduction sensitized with reducing agents, and combinations of these. The polymers of this invention are especially useful to obtain hardened emulsions containing silver halides which have been chemically sensitized with gold and the like. The fog problems often associated with emulsions, such as gold sensitized emulsions which have been hardened by reducing hardeners such as formaldehyde, mucochloric acid and the like, are substantially reduced by the use of the polymer-gelatin emulsions which do not require reducing hardeners to achieve a hardened emulsion.

The homopolymers and the interpolymers containing active methylene groups in their side chains can be used in various kinds of photographic emulsions. For example, they can be used in direct positive silver halide emulsions, x-ray and other non-spectrally sensitized emulsions as well as in orthochromatic, panchromatic and infrared sensitive emulsions, particularly those sensitized with merocyanine dyes, cyanine dyes, carbocyanine dyes and the like. Furthermore, these polymers can be used in emulsions intended for color photography, for example, emulsions containing color forming couplers or emulsions to be developed by solutions containing couplers or other color generating materials. In addition, these polymers can be used in photographic emulsions containing developers, e.g., polyhydroxybenzenes, as well as in emulsions intended for use in diffusion transfer processes which utilize the non-developed silver halide in the non-image areas of the negative to form a positive by dissolving the underdeveloped silver halide and precipitating it on a receiving layer in close proximity to the original silver halide emulsion layer. Such processes are described in Rott U.S. Pat. No. 2,352,014; Lane U.S. Pat. No. 2,543,181; and Yackel et al. U.S. Pat. No. 3,020,155.

In certain preferred embodiments the polymers of this invention are used in photographic image transfer film units such as in image transfer film units as described, for example, in U.S. Pat. Nos. 2,543,181; 2,983,606; 3,227,550; 3,227,552; 3,415,645; 3,415,644; 3,415,646 and 3,635,707; Canadian Patent 674,082 and Belgian Pat. Nos. 757,959 and 757,960, both issued Apr. 23, 1971 British Pat. Nos. 904,364 and 840,731. In highly preferred embodiments the polymers are particularly useful in the photographic element of an image transfer film unit which is designed to be processed with a single alkaline processing solution.

The polymeric materials of this invention are advantageously used in image transfer elements wherein it is desired to process with a highly alkaline processing composition and in those instances where the film unit remains laminated together after processing. The alkali resistant polymers of this invention are generally useful in image transfer film units which comprise (1) a photosensitive element comprising a support having thereon at least one layer containing a silver halide emulsion, preferably having associated therewith an image-dye-providing material and more preferably at least three of said layers which contain respectively a blue-sensitive silver halide emulsion, a green-sensitive silver halide emulsion and a red-sensitive silver emulsion; (2) an image-receiving layer which can be located on a separate support and superposed on said support containing said silver halide emulsion layers or preferably it can be coated on the same support adjacent to the photosensitive silver halide emulsion layers; and (3) means containing an alkaline processing composition adapted to discharge its contents within said film unit.

Where the receiver layer is coated on the same support with the photosensitive silver halide layers, the support is preferably a transparent support, an opaque layer is preferably positioned between the image-receiving layer and the photosensitive silver halide layer and the alkaline processing composition preferably contains and opacifying substance such as carbon or a pH indicator dye which is discharged into the film unit between a dimensionally stable support or cover sheet and the photosensitive element. A means for containing the alkaline processing solution to be any means known in the art for this purpose including rupturable containers positioned at the point of desired discharge of its contents into the film unit and adapted to be passed between a pair of juxtaposed rollers to effect discharge of the contents into the film unit, frangible containers positioned over or within the photosensitive element, hypodermic syringes and the like.

The term "image dye providing material" as ued herein is understood to refer to those compounds which either (1) do not require a chemical reaction to form the image dye or (2) undergo reactions encountered in photographic imaging systems to produce an image dye such as with color couplers, oxichromic compounds, and the like. The first class of compounds is generally referred to as preformed image dyes and includes shifted dyes, etc., while the second class of compounds is generally referred to as dye precursors.

The terms "initially diffusible" and "initially immobile" as used herein refer to compounds which are incorporated in the photographic element and upon contact with an alkaline processing solution are substantially diffusible or substantially immobile, respectively.

The image-dye-providing materials and one preferred embodiment where negative silver halide emulsions are used can be initially mobile image-dye-providing materials, such as those used in image transfer of photographic elements. Typically useful initially mobile image-dye-providing materials include dye developers as discloed in U.S. Pat. Nos. 2,983,606; 3,225,001, and the like. Oxichromic developers which undergo chromogenic oxidation to form image dyes as disclosed in U.S. Ser. No. 308,869, filed Nov. 22, 1972, shifted indophenol dye developers as disclosed in Bush and Rabin, U.S. Ser. No. 227,113, filed Feb. 17, 1972, metalized dye developers as disclosed in U.S. Pat. Nos. 3,482,972; 3,544,545; 3,551,406 and 3,563,739, and the like, which are incorporated herein by reference.

In another embodiment immobile image-dye-providing compounds can be used in association with silver halide emulsions wherein said compounds undergo oxidation followed by hydrolysis to provide an imagewise distribution of immobile image dye. Compounds of this type can be used with negative emulsions to form positive image records in the exposed photographic element or they can be used with direct-positive or reversal emulsions to form positive transfer images, such as in an image-transfer film unit. Typical useful compounds of this type are disclosed in Canadian Pat. Nos. 602,607 by Whitmore et al, issued Aug. 2, 1960; U.S. Ser. Nos. 351,673 by Fleckenstein et al. and 351,700 by Fleckenstein, both filed Apr. 16, 1973 and 160,068 by Gompf et al., now U.S. Pat. No. 3,698,897; and U.S. Pat. Nos. 3,728,113 by Becker et al.; 3,725,062 by Anderson et al.; 3,227,552 by Whitmore; 3,443,939, 3,443,940 and 3,443,941 and the like, all of which are incorporated herein by reference.

The following examples are included for a further understanding of the invention:

EXAMPLE 1

Poly(acrylamide-co-ethyl acryloylacetate) (90.0:10.0 weight percent, respectively)

To a mixture of acrylamide (180 g, 2.53 mole) and ethyl acryloylacetate (20 g, 0.14 mole) in water (1600 ml) and absolute ethanol (125 ml), maintained under a nitrogen atmosphere, was added 1.0 g 2,2'-azobis(2-methylpropionitrile). The solution was held at 65° C. for 4 hours. To this mixture was added 1 liter of water and the product was precipitated from solution by the addition of isopropyl alcohol (10 gal.), filtered, washed, and dried. The yield of the resulting fluffy, white solid was 170 g.

The polymer composition consistent with the analysis, C, 47.4 %; H, 7.6%; N, 17.3%, is 94 weight percent acrylamide and 6 weight percent ethyl acryloylacetate. The inherent viscosity was 0.95 (1N NaCl).

EXAMPLE 2

Poly(ethyl acryloylacetate-co-N-isopropylacrylamide-co-sodium-3-methacryloyloxypropane-1-sulfonate) (8.8:6.9:84.3 weight percent, respectively)

To a mixture of N-isopropylacrylamide (20.2 g, 0.18 mole), ethyl acryloylacetate (26.0 g, 0.18 mole) and sodium 3-methacryloyloxypropane-1-sulfonate (248.4 g, 1.08 mole) in water (2250 ml) and absolute ethanol (180 ml) under a nitrogen atmosphere was added 2,2'-azobis(2-methylpropionitrile) (1.0 g) as initiator. The solution was heated at 65° C. overnight. The product was precipitated from the resulting viscous solution in water with isopropanol (10 gal.), filtered, washed, and dried. The polymer had an inherent viscosity of 0.97 in 1 normal sodium chloride solution.

EXAMPLE 3

Poly(methacrylic acid-co-ethyl acryloylacetate) (50.0:50.0 weight percent, respectively)

To a mixture of methacrylic acid (10 g) and ethyl acryloylacetate (10 g) in acetone (40 ml) was added 2,2'-azobis-(2-methylpropionitrile) (0.1 g) as initiator. The solution was held at 65° C. overnight. The resulting polymer was isolated by precipitation in ether, filtered and dried. The polymer had an inherent viscosity of 0.58 in methanol.

EXAMPLE 4 Poly(ethyl acryloylacetate)

To ethyl acryloylacetate (10.0 g, 0.70M) in benzene (5 ml) was added 2,2'-azobis-(2-methylpropionitrile) (50 mg.). This mixture was held at 65° C. under a nitrogen atmosphere over-night. The resulting viscous mass was dissolved in acetone and precipitated in isopropanol. The resulting polymer was immediately filtered and dissolved in acetone. The yield was 7.0 g.

EXAMPLE 5

Poly[6-(m- and p-vinylphenyl)-2,4-hexanedione]

To 6-(m- and p-vinylphenyl)-2,4-hexanedione (10.0 g, 0.046 M) in benzene (5 ml) was added 2,2'-azobis(2-methylpropionitrile) (50 mg). This mixture was held at 60° C. under a nitrogen atmosphere overnight. The resulting viscous mass was dissolved in acetone and precipitated in isopropanol. The resulting polymer was immediately filtered and dissolved in acetone for future use. The yield was 8.0 g.

EXAMPLE 6

Poly[6-(m- and p-vinylphenyl)-2,4-hexanedione]

To 6-(m- and p-vinylphenyl)-2,4-hexanedione (13 g, 0.06 M) in 60 ml of water and 1 ml of Triton 770 (40% active ingredient) surface active agent was added potassium persulfate (100 mg) and sodium bisulfite (33 mg). This emulsion system was then held at 80° C. under a nitrogen atmosphere for two hours. The resulting emulsion was dialyzed overnight in a distilled water bath. The yield was 10.0 g.

EXAMPLE 7

Poly[acrylamide-co-6-(m- and p-vinylphenyl)-2,4-hexanedione] (10.0:90.0 weight percent, respectively)

To water (120 ml), potassium persulfate (200 mg), and sodium bisulfite (20 mg) at 80° C. under a nitrogen atmosphere were added, simultaneously, 6-(m- and p-vinylphenyl)-2,4-hexanedione (18 g, 0.083 M) from one dropping funnel and acrylamide (2 g, 0.028 M) and sodium bisulfite (20 mg) in water (20 ml) from another funnel. This emulsion system was kept at 80° C. under a nitrogen atmosphere for 2 hours. The resulting emulsion was dialyzed overnight in a distilled water bath. The yield was 20 g.

EXAMPLE 8

Poly[6-(m- and p-vinylphenyl)-2,4-hexanedione-co-sodium-3-methacryloyloxypropane-1-sulfonate] (48.5:51.5 weight percent, respectively)

To a mixture of 6-(m- and p-vinylphenyl)-2,4-hexanedione (130 g, 0.6 M) and sodium 3-methacryloyloxypropane-1-sulfonate (138 g, 0.6 M) in dimethyl sulfoxide (800 ml), maintained under a nitrogen atmosphere, was added 2.0 g of 2,2'-azobis-(2-methylpropionitrile). The solution was kept at 60°–65° C. for 20 hours. The product was precipitated from solution with isopropanol (4 gal), filtered, washed, and the resulting white solid dissolved immediately in water at 15.7 percent solids. The yield was 100 percent.

EXAMPLE 9

Poly[6-(m- and p-vinylphenyl)-2,4-hexanedione-co-sodium-2-acrylamido-2-methyl propane-1-sulfonate] (48.5:51.5 weight percent, respectively)

To a mixture of 6-(m- and p-vinylphenyl)-2,4-hexanedione (6.5 g, 0.03 M) and sodium 2-acrylamido-2-methylpropanesulfonate (6.9 g, 0.03 M) in dimethyl sulfoxide (40 ml), maintained under a nitrogen atmosphere, was added 2,2'-azobis(2-methylpropionitrile) (0.1 g). The solution was kept at 60°–65° C. for 20 hours. The product was precipitated from solution with isopropanol (1 gal.), filtered, washed and the resulting white solid dissolved immediately in water at 11.1 percent solids. The yield was 55 percent.

EXAMPLE 10

Poly[6-(m- and p-vinylphenyl)-2,4-hexanedione-co-sodium p-styrenesulfonate] (51.2:48.8 weight precent, respectively)

To a mixture of 6-(m- and p-vinylphenyl)-2,4-hexanedione (13.0 g, 0.06 M) and sodium p-styrenesulfonate (12.4 g., 0.06 M) in dimethyl sulfoxide (60 ml), maintained under a nitrogen atmosphere, was added 2,2'-azobis(2-methylpropionitrile) (0.2 g). The solution was kept at 60°–65° C. for 20 hours. The product was precipitated from solution with isopropanol (1 gal.), filtered, washed and the resulting white solid dissolved immediately in water at 13.3 percent solids. The yield was 80 percent.

EXAMPLE 11

Poly[acrylamide-co-6-(m- and p-vinylphenyl)-2,4-hexanedione] (90:10 weight percent, respectively)

To a mixture of acrylamide (18.0 g, 0.253 M) and 6-(m- and p-vinylphenyl)-2,4-hexanedione (2 g, 0.009 M) in water (160 ml) and absolute ethanol (20 ml), maintained under a nitrogen atmosphere, was added 2,2'-azobis(2-methylpropionitrile) (0.1 g). The solution was kept at 65° C. for 6 hours. The product was precipitated from the resulting viscous solution with isopropanol (4 1), filtered, washed, and immediately dissolved in water at 5.5% solids. The polymer has an inherent viscosity of 1.21 in 1 normal sodium chloride solution.

The following polymers were prepared in a manner similar to the preparation of the polymer of Example 1:

Poly[acrylamide-co-6-(m- and p-vinylphenyl)-2,4-hexanedione] (90:10 and 85:15 weight percent, respectively)
Poly[acrylamide-co-N,N-diethyl-5-(m- and p-vinylphenyl)-3-oxopentanoic acid amide] (90:10 weight percent, respectively)
Poly[acrylamide-co-ethyl 5-(m- and p-vinylphenyl)-3-oxopentanoate] (90:10 and 80:20 weight percent, respectiveiy)
Poly[acrylamide-co-N,N-dimethylacryloylacetamide] (80:20 and 90:10 weight percent, respectively).

Other polymers within the scope of this invention which have been prepared in a similar fashion as the polymer in Example 4 include poly[ethyl 5-(m- and p-vinylphenyl)-3-oxopentanoate],poly[N,N-diethyl-5-(m- and p-vinylphenyl)-3- oxopentanoic acid amide], poly[t-butyl 5-(m- and p-vinylphenyl)-3-oxopentanoate].

The following polymers were prepared in a similar manner as the polymer in Example 7 in weight ratios of the first polymerized monomer to the second polymerized monomer from about 1:9 to about 4:1:

Poly[methacrylic acid-co-ethyl acryloylacetate] (15:85 and 10:90, weight percent, respectively)
Poly[methacrylic acid-co-6-(m- and p-vinylphenyl)-2,4-hexanedione](15:85 and 10:90, weight percent, respectively)
Poly[methacrylic acid-co-ethyl 5-(m- and p-vinylphenyl)-3-oxopentanoate](15:85 and 10:90, weight percent, respectively)
Poly[methacrylic acid-co-N,N-diethyl-5-(m- and p-vinylphenyl)-3-oxopentanoic acid amide] (15:85 weight percent, respectively)
Poly[methacrylic acid-co-t-butyl 5-(m- and p-vinylphenyl-3-oxopentanoate] (15:85 weight percent, respectively)
Poly[n-butyl acrylate-co-methacrylic acid-co-ethyl acryloylacetate] (10:10:80 weight percent, respectively) Poly[n-butyl acrylate-co-methacrylic acid-co-6-(m- and p-vinylphenyl)-2,4-hexanedione] (10:15:75 weight percent, respectively)
Poly[n-butyl acrylate-co-ethyl acryloylacetate] (50:50 weight percent, respectively)
Poly[n-butyl acrylate-co-6-(m- and p-vinylphenyl)-2,4-hexanedione] (50:50 weight percent, respectively.

The following polymers which are within the scope of this invention were prepared by solution polymerization in benzene:

Poly[2-hydroxyethyl methacrylate-co-ethyl acryloylacetate] (1.0:4.0 molar ratio)
Poly[2-hydroxyethyl methacrylate-co-6-(m- and p-vinylphenyl)-2,4-hexanedione] (1.0:3.0 molar ratio)

The following example illustrates the use of polymers described herein as vehicles in photographic elements. This use was disclosed and claimed in copending U.S. application Ser. No. 394,002, filed Sept. 4, 1973.

EXAMPLE 12

This example demonstrates that poly(acrylamide-co-ethyl acryloylacetate) (weight ratio: 90/10), similar to the copolymer with weight ratio 94/6 described in Example 1, can be used as the vehicle for an all-polymeric photographic film which after exposure and processing yields sensitometric results which are quite similar to those obtained after dispersion of grains from the same emulsion in gelatin.

A high-speed silver bromoiodide (94:6) negative emulsion, similar to the type of emulsion described by Trivelli and Smith (PSA J. Vol. 79, 330), was prepared using as the peptizer poly(3-thiapentyl acrylate-co-3-acryloyloxypropane-1-sulfonic acid, sodium salt) (mole ratio 1:6). This polymeric peptizer contains a thioether group and was described in U.S. Pat. No. 3,615,624. Removal of soluble salts and concentration of the emulsion were carried out by ultrafiltration. After digestion to optimum speed, the emulsion was split into several parts, one of which was dispersed in poly(acrylamide-co-ethylacryloylacetate) (weight ratio: 90/10) (160 g per silver mole), and another part in gelatin (160 g per silver mole). After admixture of customarily used adjuvants and of a crosslinking agent (2g formaldehyde per 100 g of polymer or gelatin) both emulsions were coated on a transparent support so as to yield a coverage of 53.82 mg./dm$^2$ silver and 79.85 mg/dm$^2$ vehicle (polymer or gelatin, respectively). Exposure (500 W, 5400° K) and development with a metol-hydroquinone metaborate normal constrast developer (5 minutes in Kodak Developer DK-50) (20° C.) yielded the following sensitometric results. Polymer A is poly(acrylamide-co-ethyl acryloylacetate) (weight ratio: 90/10).

| Vehicle | Relative Speed | Gamma | Net Fog (Total Fog Minus Base Density) |
|---|---|---|---|
| Polymer "A" | 155 | 1.00 | 0.10 |
| Gelatin | 100 | 0.82 | 0.06 |

My co-worker, R. G. Mowrey, and I have discovered that polymers of this invention can be used as replacements for the conventional gelatin emulsion vehicles, particularly in photographic silver-dye bleach elements. This use is disclosed and claimed in our copending U.S. application Ser. No. filed of even date herewith and entitled "Hardenable Vehicles for Silver Halide Emulsions." Improved sensitometric results are obtained because of the presence of cross-linking sites in the polymers which, when cross-linked, are more stable to the bleaching conditions of the process. The following example illustrates this application of polymers herein described.

EXAMPLE 13

A series of coatings on a polyester film support comprising an azo dye having the structure

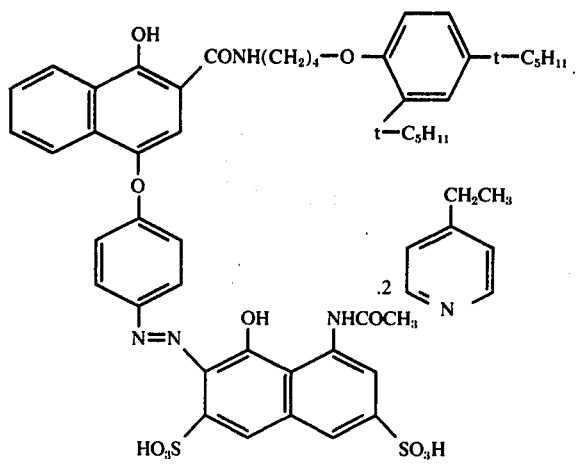

dispersed in various vehicles within the scope of this invention were prepared as identified in Table I.

TABLE I

| Sample No. | Vehicle | Conc. mg/ft² | (mg/dm²) | Formaldehyde Hardener mg/ft² | (mg/dm²) |
|---|---|---|---|---|---|
| 1 (Control) | Gelatin | 250 | (26.9) | 2.5 | (0.269) |
| 2 (Control) | Gelatin | 250 | (26.9) | 25.0 | (2.69) |
| 3 | XY - 90 | 250 | (26.9) | 2.5 | (0.269) |
| 4 | XY - 90 | 250 | (26.9) | 25.0 | (2.69) |
| 5 | XZ' - 80 | 250 | (26.9) | 2.5 | (0.269) |
| 6 | XZ' - 80 | 250 | (26.9) | 25.0 | (2.69) |
| 7 | XZ - 90 | 250 | (26.9) | 2.5 | (0.269) |
| 8 | XZ - 90 | 250 | (26.9) | 25.0 | (2.69) |
| 9 | XZ - 80 | 250 | (26.9) | 2.5 | (0.269) |
| 10 | XZ - 80 | 250 | (26.9) | 25.0 | (2.69) |

The materials used as vehicles are identified as having the following structures:

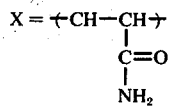
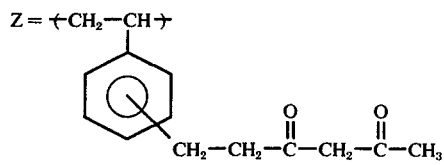
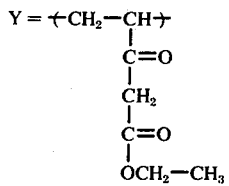
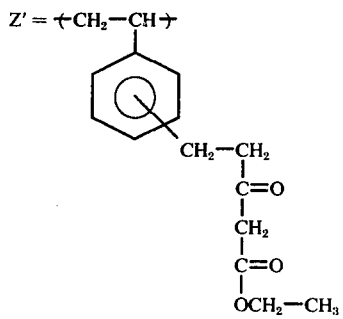

The numbers used with the vehicle identification letters refer to the weight percent of the material called X based on the total polymer weight if the polymerization went to 100% conversion. An acidic activator sheet was also prepared.

Procedure: To test the polymeric vehicles, separate samples of the activator sheet were preheated to 100° C. for 10 seconds and then laminated for 10 seconds at 100° C. with samples of the dye coatings. While molten, the coatings were separated, cooled and washed in water, and the dye coatings evaluated for reticulation and adhesion. Results: No adhesion of the dye layer to its original support was observed with Sample 1, and complete degradation of the gelatin vehicle had occurred. In Sample 2, which employed gelatin and a higher level of formaldehyde, some degradation and loss of gelatin had occurred, but the results were improved. In the remaining Samples 3 through 10, the dyed layer remained intact with no apparent degradation of the vehicles.

EXAMPLE 14

Preparation of 6-(m- and P-vinylphenyl)-2,4-hexanedione

To a suspension of sodium hydride (41.3 g, 1M) 57% oil dispersion) in tetrahydrofuran (2 l) at 0°–10° C was added 2,4-pentanedione (100 g, 1M) and the solution was stirred at 0° C. for 15 minutes. Then n-butyllithium (1M) in hexane was added slowly at 0°–10° C. and the solution of the dianion was stirred at 0° C. for an additional 15 minutes. Vinyl benzyl chloride (obtained from the Dow Chemical Company as a mixture of meta (60 percent) and para (40 percent) isomers (152.5 g, 1M) was added at 0° C. and the reaction mixture was stirred at room temperature for 1–2 hours. The mixture was poured onto cracked ice containing hydrochloric acid (200 ml). The organic layer was separated and the aqueous layer was extracted with cloroform (5 × 150 ml). The combined organic extracts were washed with saturated bicarbonate solution (250 ml), saturated sodium chloride solution (250 ml) and water (250 ml), dried, filtered and the solvent removed.

The residual oil was diluted with an equal volume of methanol and poured into a large excess of hot copper acetate solution (200 g. in 1750 l of water). The copper chelate of the diketone fell out; was filtered off and washed with water, followed by ligroin (1 l.). The copper chelate was then decomposed in the presence of ice-cold 10% sulfuric acid and the mixture extracted with ether (5 × 200 ml); the ether extracts were washed with saturated bicarbonate solution (2 × 250 ml), saturated sodium chloride solution (250 ml) and water (250 ml), dried, filtered and the solvent removed. The residue was distilled giving 6-(m- and P-vinylphenyl)-2,4-hexanedione boiling at 77°–82° C. at 0.005 mm. The yield was 65%. With analysis, the amount of carbon in the final product was 77.7 weight percent, as compared to 77.8% theoretical; the amount of hydrogen in the final product was 7.6 weight percent, as compared to 7.4% theoretical.

EXAMPLE 15

Example 13 was repeated using the following polymers:

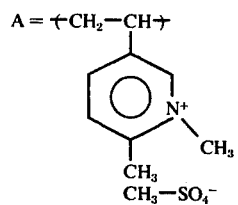

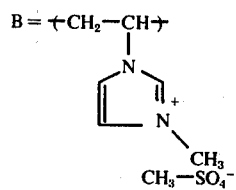

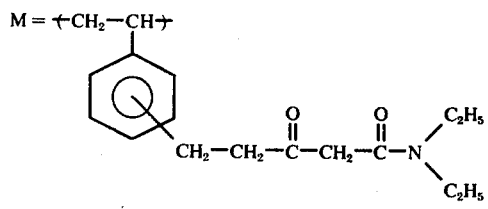

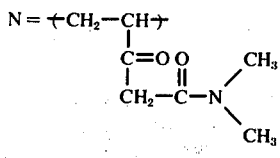

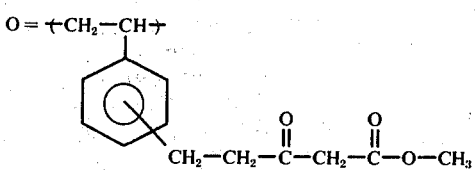

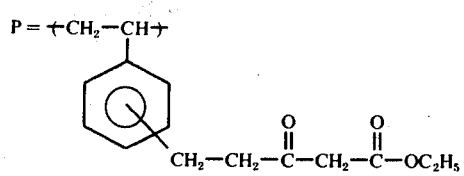

in ratio and coating structure as follows:

| | |
|---|---|
| AY | 90:10 |
| BZ | 90:10 |
| BY | 90:10 |
| XM | 90:10 |
| XO | 90:10 |
| XP | 80:20 |
| XN | 90:10 |

One series of coating structures contained 125 mg/ft² of polymer and gelatin and another contained 250 mg/ft² of polymer with only sufficient gelatin to peptize the silver halide emulsion. The hardener was 1% formalin. The results were substantially identical to those obtained in Example 13.

This invention has been described in detail with particular reference to certain preferred embodiments thereof, but it will be understood that variations and modifications can be effected within the spirit and scope of the invention.

What is claimed is:

1. A polymer comprising
   A. from about 1 to 100% by weight of a polymerized monomer containing at least one active methylene group and having the formula

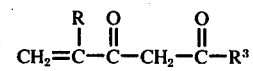

wherein R is hydrogen or methyl, and $R^3$ is alkoxy containing from 1 to 10 carbon atoms or amino having the structure atoms;

wherein $R_4$ and $R_5$ are independently selected from the group consisting of hydrogen, alkyl having 1 to 10 carbon atoms and aryl containing from 6 to 12 carbon atoms and
   B. from 0 to about 99% by weight of at least one additional polymerized ethylenically unsaturated monomer.

2. The polymer of claim 1 wherein the polymer has an inherent viscosity in the range of 0.10 to 2.0.

3. The polymer of claim 1 wherein at least one of the additional polymerized ethylenically unsaturated monomers is selected from the group consisting of acrylamide, n-butyl acrylate, 2-hydroxyethyl methacrylate, N-isopropylacrylamide, N,N-dimethyl-N-2-hydroxypropylamine methacrylimide, methacrylamide, methacrylic acid, sodium 2-acrylamido-2-methylpropane-1-sulfonate, sodium 4-acryloyloxybutane-2-sulfonate, sodium 3-acryloyloxypropane-1-sulfonate, sodium 3-methacryloyloxypropane-1-sulfonate, sodium p-styrene sulfonate, 3-methyl-1-vinylimidazolium methosulfate and 1,2-dimethyl-5-vinylpyridinium methosulfate.

4. The polymer of claim 1 wherein at least one of the additional polymerized ethylenically unsaturated monomers is a sulfoacrylate salt.

5. The polymer of claim 1 wherein the polymerized monomer of the formula

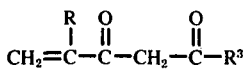

is selected from the group consisting of ethyl acryloylacetate, N,N-dimethylacryloylacetamide and tert-butyl acryloylacetate.

6. The polymer of claim 1 wherein the polymerized monomer of the formula

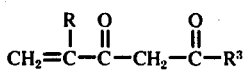

is ethyl acryloylacetate.

7. A homopolymer comprising a polymerized monomer containing at least one active methylene group and having the formula

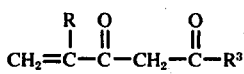

wherein R is hydrogen or methyl, and $R^3$ is alkoxy containing from 1 to 10 carbon atoms or amino having the formula

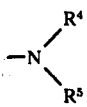

wherein $R_4$ and $R_5$ are independently selected from the group consisting of hydrogen, alkyl containing from 1 to 10 carbon atoms, cycloalkyl containing from 5 to 7 carbon atoms and aryl containing from 6 to 12 carbon atoms.

8. The homopolymer of claim 7 wherein the inherent viscosity is in the range of 0.10 to 2.0.

9. The homopolymer of claim 7 wherein the polymerized monomer of the formula

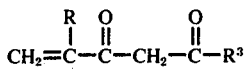

is selected from the group consisting of ethyl acryloylacetate, N,N-dimethylacryloylacetamide and tert-butyl acryloylacetate.

10. A compound having the formula

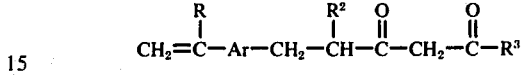

wherein R is hydrogen or methyl, Ar is arylene containing from 6 to 12 carbon atoms, $R^2$ is hydrogen, alkyl containing from 1 to 10 carbon atoms, aryl containing from 6 to 12 carbon atoms or cycloalkyl containing from 5 to 7 carbon atoms, and $R^3$ is alkyl containing from 1 to 10 carbon atoms, amino having the formula

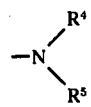

wherein $R_4$ and $R_5$ are independently selected from the group consisting of hydrogen, alkyl containing from 1 to 10 carbon atoms, cycloalkyl containing from 5 to 7 carbon atoms, and aryl containing from 6 to 12 carbon atoms; cycloalkyl containing from 5 to 7 carbon atoms, or aryl containing from 6 to 12 carbon atoms.

11. The compound of claim 10 selected from the group consisting of t-butyl 5-(m- and p-vinylphenyl)-3-oxopentanoate, N,N-diethyl-5-(m- and p-vinylphenyl)-3-oxopentanoic acid amide, ethyl-5-(m- and p-vinylphenyl)-3-oxopentanoate and 6-(m- and p-vinylphenyl-2,4-hexanedione).

* * * * *

UNITED STATES PATENT AND TRADEMARK OFFICE
CERTIFICATE OF CORRECTION

PATENT NO. : 4,011,201
DATED : March 8, 1977
INVENTOR(S) : Ignazio S. Ponticello It is certified that error appears in the above-identified patent and that said Letters Patent are hereby corrected as shown below:

Column 5, line 16, "norborine" should read --norborene--;
Column 5, lines 22-33, the formula should read -- 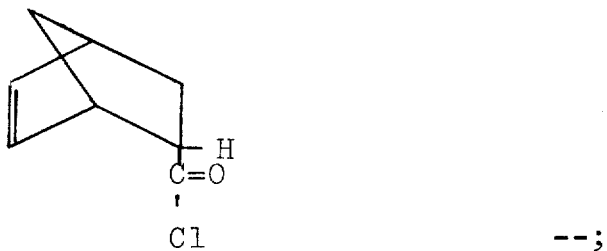 --;

Column 5, line 39, "either" should read --ether--;
Column 5, lines 43-58, the formula should read -- 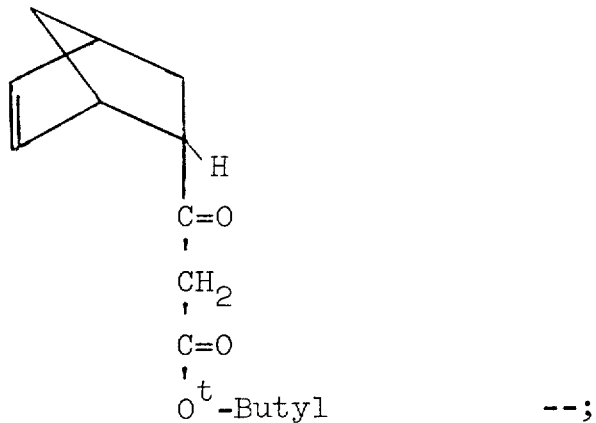 --;

Column 7, line 39, "gelatine" should read --gelatin--;
Column 9, line 66, "ued" should read --used--;

UNITED STATES PATENT AND TRADEMARK OFFICE
CERTIFICATE OF CORRECTION

PATENT NO. : 4,011,201
DATED : March 8, 1977
INVENTOR(S) : Ignazio S. Ponticello It is certified that error appears in the above-identified patent and that said Letters Patent are hereby corrected as shown below:

Column 18, line 34, delete "atoms;";
Column 20, line 22, after "atoms," insert --alkoxy,--.

Signed and Sealed this

*Twenty-fifth* Day of *October 1977*

[SEAL]

Attest:

RUTH C. MASON
*Attesting Officer*

LUTRELLE F. PARKER
*Acting Commissioner of Patents and Trademarks*